United States Patent
Voronkov et al.

(10) Patent No.: US 10,133,589 B2
(45) Date of Patent: Nov. 20, 2018

(54) IDENTIFYING HELP INFORMATION BASED ON APPLICATION CONTEXT

(71) Applicant: Microsoft Technology Licensing, LLC, Redmond, WA (US)

(72) Inventors: Nikita Voronkov, Bothell, WA (US); Quanjie Lin, Redmond, WA (US); Dmitriy Meyerzon, Bellevue, WA (US); Welly Lee, Redmond, WA (US); Reenu Sandhu, Redmond, WA (US); Tom Tseng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 448 days.

(21) Appl. No.: 14/145,792

(22) Filed: Dec. 31, 2013

(65) Prior Publication Data
US 2015/0186153 A1  Jul. 2, 2015

(51) Int. Cl.
G06F 3/0481   (2013.01)
G06F 17/30   (2006.01)
G06F 9/451   (2018.01)

(52) U.S. Cl.
CPC ............ *G06F 9/453* (2018.02); *G06F 3/0481* (2013.01); *G06F 17/30528* (2013.01)

(58) Field of Classification Search
CPC .............. G06F 9/4446; G06F 3/04812; G06F 17/30864; G06F 17/30528; G06F 3/0481
See application file for complete search history.

(56) References Cited

U.S. PATENT DOCUMENTS

| 6,021,403 | A | * | 2/2000 | Horvitz ................. G06F 9/4446 706/11 |
| 7,849,405 | B1 | | 12/2010 | Coletta et al. |
| 8,095,523 | B2 | | 1/2012 | Brave et al. |
| 8,108,385 | B2 | | 1/2012 | Kraft et al. |

(Continued)

FOREIGN PATENT DOCUMENTS

| CN | 1763742 A | 4/2006 |
| CN | 101079069 A | 11/2007 |

(Continued)

OTHER PUBLICATIONS

International Search Report & Written Opinion Issued in PCT Patent Application No. PCT/US2014/069865, dated Mar. 9, 2015, 11 Pages.

(Continued)

*Primary Examiner* — William L Bashore
*Assistant Examiner* — Daniel W Parcher
(74) *Attorney, Agent, or Firm* — Michael Best & Friedrich LLP

(57) ABSTRACT

A system for presenting help information relating to a user of a computer program based on context of the computer program is provided. The system receives an indication of a generic request and identifies the context of the computer program at the time of the request. The context may include information that is currently being displayed by the computer program and metadata relating to the user and the computer program. The system selects help information based on the context such that the selected help information varies based on information that is currently being displayed and the metadata. The system then presents the help information to the user.

18 Claims, 9 Drawing Sheets

(56) References Cited

U.S. PATENT DOCUMENTS

| | | | |
|---|---|---|---|
| 2005/0262481 A1* | 11/2005 | Coulson | G06F 9/4443 717/120 |
| 2006/0036991 A1 | 2/2006 | Biazetti et al. | |
| 2006/0085750 A1* | 4/2006 | Easton, Jr. | G06F 9/4446 715/708 |
| 2007/0277104 A1* | 11/2007 | Hennum | G06F 9/4446 715/705 |
| 2008/0301558 A1* | 12/2008 | Najafi | G06F 9/4446 715/708 |
| 2009/0037355 A1* | 2/2009 | Brave | G06F 17/30867 706/45 |
| 2010/0050079 A1* | 2/2010 | Thompson | G06F 9/4446 715/708 |
| 2010/0070484 A1* | 3/2010 | Kraft | G06F 17/30867 707/706 |
| 2010/0076978 A1 | 3/2010 | Cong et al. | |
| 2011/0106841 A1 | 5/2011 | Cao et al. | |
| 2012/0042002 A1* | 2/2012 | Smith | G06F 9/4446 709/203 |
| 2012/0166377 A1 | 6/2012 | Sathish et al. | |
| 2012/0166945 A1* | 6/2012 | Roberts | H04N 21/4126 715/708 |
| 2013/0132497 A1 | 5/2013 | Partridge et al. | |
| 2015/0019994 A1* | 1/2015 | Freudenthaler | H04M 1/7253 715/748 |

FOREIGN PATENT DOCUMENTS

| | | | |
|---|---|---|---|
| CN | 102081518 A | 6/2011 | |
| WO | 03048930 A2 | 6/2003 | |
| WO | WO 03/048930 | * 6/2003 | G06F 9/44 |

OTHER PUBLICATIONS

"Office Action Issued in European Patent Application No. 14825510.2", dated Aug. 9, 2017, 6 Pages.

Second Written Opinion Issued in PCT Patent Application No. PCT/US2014/069866, dated Nov. 16, 2015, 9 Pages.

International Preliminary Report on Patentabilty Issued in PCT Application No. PCT/US2014/069866, dated Mar. 18, 2016, 8 Pages.

"First Office Action and Search Report Issued in Chinese Patent Application No. 201480071765.2", dated Jul. 27, 2018, 14 Pages.

* cited by examiner

IDENTIFYING HELP INFORMATION BASED ON APPLICATION CONTEXT

BACKGROUND

Most applications (i.e., computer programs) provide user interfaces through which a user can interact with the application. The user interfaces may be very sophisticated and provide the user with hundreds of different capabilities (e.g., auto correct and insert link). A user who is not very experienced with an application may not be aware of certain capabilities or may not know how to use certain capabilities. To assist such users with the user interface, applications typically provide a help system through which a user can request help information describing the various capabilities. The help information for an application is typically stored in a help file. A help file may have an entry for each topic of information that is available. For example, a word processing application that can automatically correct misspellings, an "AutoCorrect" capability, may have a help entry describing the capability. Each help entry may include the title or name of the topic and an article that describes the topic in some detail. FIG. 1 is a diagram that illustrates the structure of an example help file. In this example, the help file (which may implemented as a database) includes a help document 101 and an index 102. The help document contains the help entries of the help file, and the index provides a mapping from various keywords (including phrases) to the related topics in the help document. In this example, the keywords "AutoCorrect" and "Spelling Correction" are mapped to the help entry for the "AutoCorrect" topic. A keyword may be mapped to multiple topics. For example, the "AutoCorrect" keyword may be also mapped to a help entry explaining how to turn off the "AutoCorrect" capability.

FIGS. 2A and 2B illustrate a typical way of using a help system. When a user requests help, the help system displays a dialog box 201. The dialog box includes an input field 202 that allows a user to enter a keyword of interest. In this example, the user has entered the keyword "spelling." The help system identifies all the keywords in the index file that begin with the word "spelling." The help system then displays those keywords in a keyword display field 203. When a user selects one of the displayed keywords, the help system identifies the topics that are mapped to the selected keyword using the index and displays the titles of those topics to the user. The user can then select a topic of interest. When a topic is selected, the help system retrieves and displays the help article for the selected topic as shown in dialog box 204.

Typical help systems also allow users to enter queries or questions, rather than simply selecting from indexed keywords. When a user submits a query, the help system may search the help document to identify topics that match the user query. (A help file may include a search catalog that the help system searches, rather than searching the entire help document. The search catalog may be generated from the content file and can be used to improve the speed of searching.) The help system then displays the titles of the matching topics so that the user can selectively view the help articles that the user thinks may be relevant. FIG. 3 illustrates a dialog box for entry of a user query. Dialog box 301 includes an input field 302 where a user can enter their query. The query may be in the form of a question or a phrase or words of interest. In this example, the user entered the question "How do I stop my name from being changed?" This question might be asked, for example, if the user's name is "Juli" and the "AutoCorrect" capability is configured to automatically "correct" that word to "July" on the assumption that the user simply misspelled the month. After a query is entered, the help system identifies the topics that best match or that are most relevant to, the query. Help systems may use various well-known search algorithms for identifying the matching topics. The help system then displays the matching topics in a display field 303. The user can then select one of the displayed topics to view its help article.

Unfortunately, many of the help systems often do not locate any topics that the user finds relevant. In the example of FIG. 3, the help system determined that the topics "field names" and "stop words" best match the user query. The help system, however, did not identify the "AutoCorrect" topic because none of the non-noise words (e.g., "stop," "name," and "changed") are contained in the content of the "AutoCorrect" topic. In such a situation, the user may not even be aware of the "AutoCorrect" capability and thus may not be able to formulate a query that would identify that topic. The user is only provided with topics that are not relevant to the user's query and has no effective way to identify the relevant topic.

SUMMARY

A method and system for presenting help information relating to a user of a computer program based on the context of the computer program is provided. The system receives an indication of a generic request and identifies the context of the computer program. The context may include information that is currently being displayed by the computer program and metadata relating to the user and the computer program. The system selects help information based on the context such that the selected help information varies based on information that is currently being displayed as well as the metadata. The system then presents the help information to the user.

DETAILED DESCRIPTION

Figure 1:
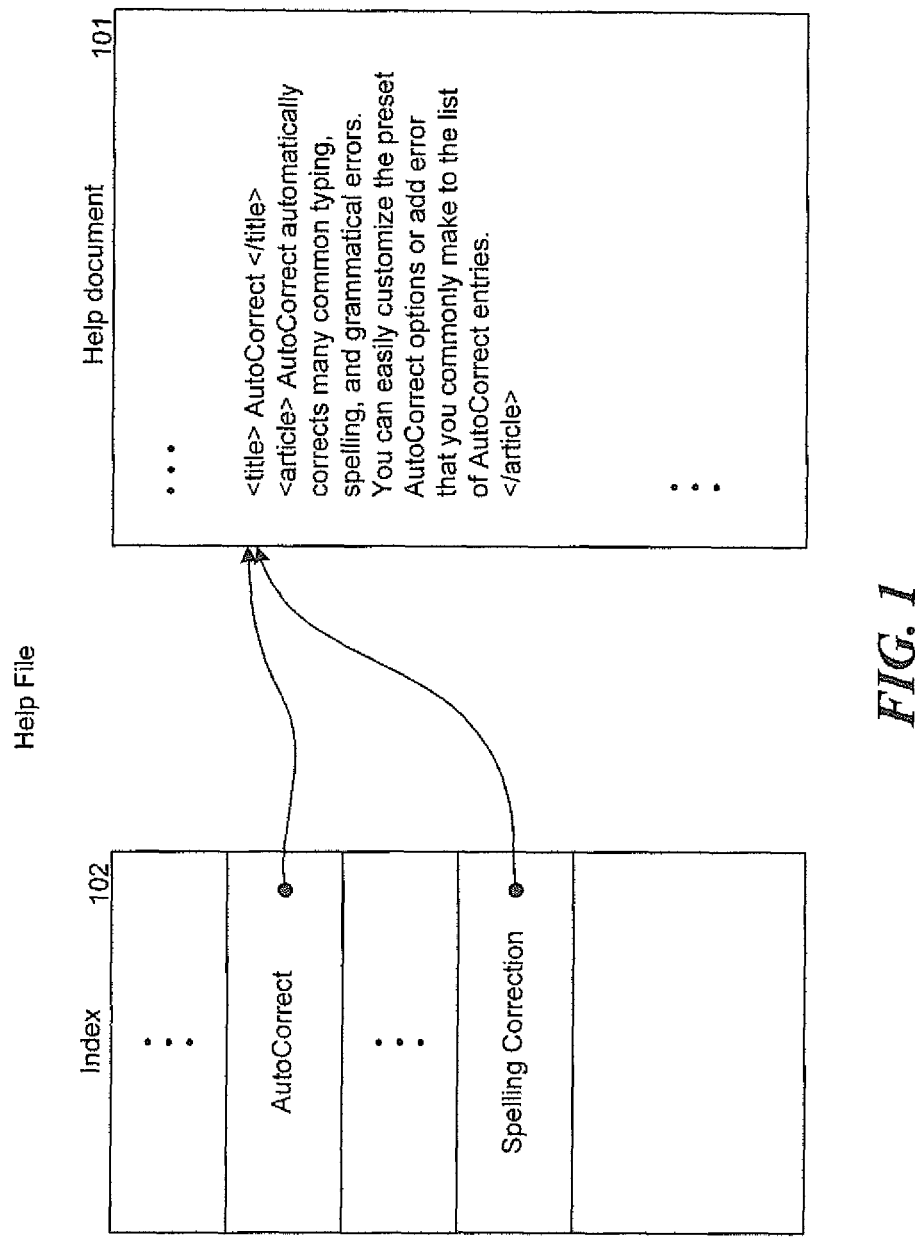
FIG. 1 is a diagram that illustrates the structure of an example help file.
Figure 2A:
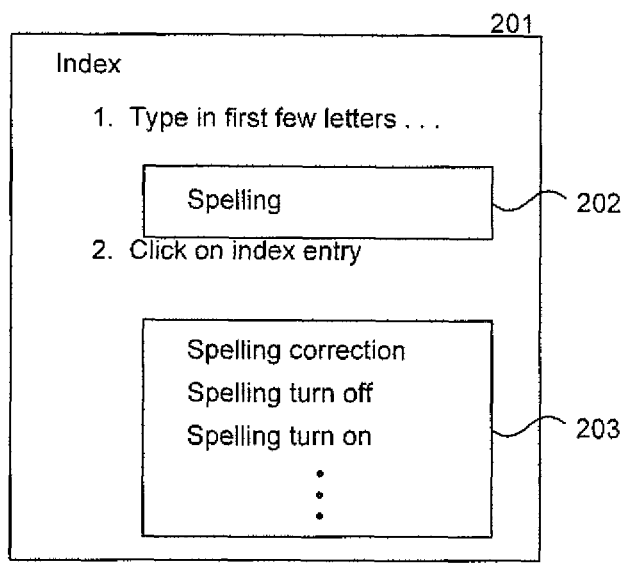
FIGS. 2A and 2B illustrate a typical way of using a help system.
Figure 2B:
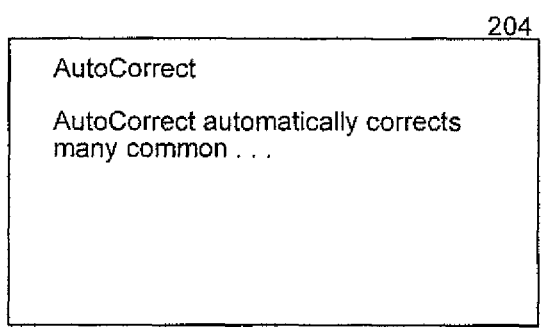
Figure 3:
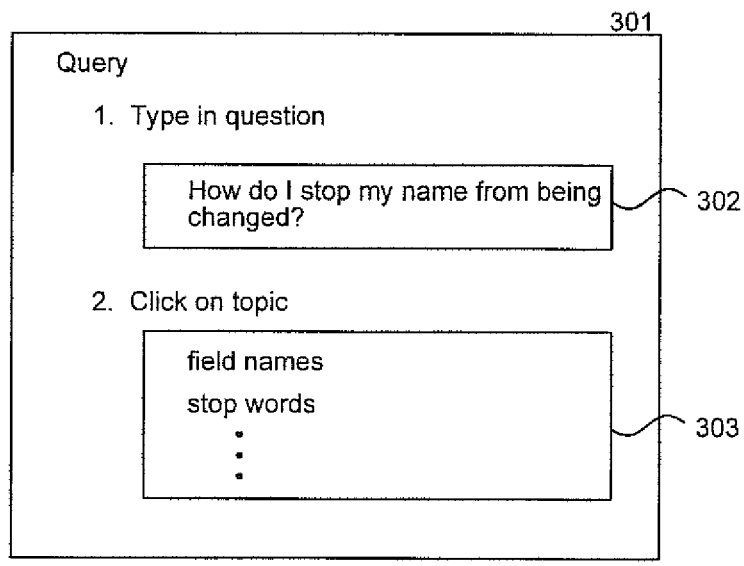
FIG. 3 illustrates a dialog box for entry of a user query.

A method and system for providing help information relating to the use of a computer program is provided. In some embodiments, a context-based help system provides help information that is appropriate to the context of a computer program without requiring a user to submit a query. The context-based help system may provide the help information in response to a user submitting a generic request for help or automatically without requiring any action of the user. A generic request for help is a request that does not include a query input by a user. For example, a computer program may provide a help button that when selected by a user submits a generic request for help. After a generic request has been submitted, the context-based help system identifies the context of the computer program. The context of the computer program may include information that is currently being displayed by the computer program, metadata relating to the computer program, metadata relating to the user of the computer program, metadata relating to a document being processed by the computer program, information on a recent action by the computer program (e.g., auto correct) or user (e.g., select a hyperlink), and so on. After identifying the context of the computer program, the context-based help system accesses a context-to-help information mapping that maps various contexts to the appropriate help information. The context-based help system retrieves the mapped-to help information and presents that information to the user. As a result, the context-based help system provides information that is appropriate regarding the context of the computer program without requiring the user to submit a query request. When the context-based help system uses the displayed content as part of the context, the help information is dynamically adjusted to the specified context. For example, if a web page (e.g., "acme.com") originally included a news feed from a news service, the context-based help system would provide help information for that news service. If the web page is changed to use the news feed from a different news service, the context-based help system would automatically provide help for that different news service based on the different context.

The context-based help system may define the context using various types of features (i.e., information) that relate to the computer program. The set of features defining the context is referred as a feature vector. Some features may relate to information that is currently being displayed by the computer program such as content of a document (e.g., table and web page), content of a customizable user interface (e.g., ribbons, tool bars, and menus), and so on. For example, if a document currently being displayed includes links to applications, then a feature may represent the names of those applications that allow help information, for example, describing the overall function of those applications, to be provided. As another example, if a tool bar contains an icon for a certain tool (e.g., an equation editor), then a feature may also represent that the tool is on the tool bar so that the help information can provide help information for that tool or can direct the user to select the tool from the tool bar, rather than accessing the tool through a menu hierarchy. Other features may relate to the metadata for the computer program such as the version of the computer program, the license type for the computer program (e.g., student edition versus corporate edition), and so on. Since the different versions and license types may provide different capabilities, by including these features, the context-based help information can be tailored to the available capabilities. Features may relate to information about the user such as role of the user (author of the document versus editor of the document), expertise of the user with the computer program (e.g., experienced versus novice), and so on. Features may also relate to the metadata of the document such as the type of the document (e.g., ".txt" versus ".doc"), version of the document, read/write status of the document, and so on. For example, if the document type is a ".txt," then the help information may not describe formatting options that are only appropriate to a document type of ".doc."

In some embodiments, the context-based help system maintains a mapping of context criteria to help articles containing help information. Each help article has one or more associated context criteria that defines the context(s) for which the help article is appropriate. Context that satisfies a context criterion is considered to match both the context criterion and its help article. For example, when the context has a content feature and a user feature, the context may be represented as (equation, experienced) meaning that the displayed content includes an equation and that the user is an experienced user of the computer program. A context criterion for a help article describing the use of equations may be (equation, *) where the asterisk represents a wildcard. Any context with "equation" as the content feature would match this context criterion regardless of the user feature. If there was a first help article on equations for experienced users and a second help article on equations for novice users, then the context criterion for the first help article might be (equation, experienced) and the context criterion for the second help article might be (equation, novice). A context criterion may be specified in various ways ranging from specifying one value for each feature that is needed to match to providing a function of arbitrary complexity that inputs a context and returns a flag indicating whether there is a match. In some cases, a feature of a context can have multiple values. For example, if the content being displayed includes an equation and a table, then the context might be (equation/table, experienced). In such a case, the context would match the following context criteria: (equation, experienced), (table, experienced), (equation, *), and (table, *). If the help information includes an equation help article for experienced users and a table help article for experience users, then the context-based help system would present both articles to a user. Also, if no articles (or not enough) exactly match the context criterion, the context-based help system may use various heuristics to select near matches. For example, if the user feature is experienced for a context that does not exactly match any context criterion, then a context criteria with a user feature that is novice may be considered a near match. In such a case, the context-based help system would present the help article based on that near match.

In some embodiments, when the context matches the context criteria for multiple help articles, the context-based help system may rank or order the help articles using various techniques. The context-based help system may use experience-based techniques to rank articles based on user interactions with help articles. The context-based help system may maintain a count of the number of times users clicked through each help article presented for a specific context. For example, for a context of (equation/table, experienced) users may have clicked through the equation help article 90 times and clicked through the table help article only 10 times. In such a case, the context-based help system would rank the equation help article higher than the table help article. The experience-based techniques may also be based on input (e.g., view counts, "likes," and "votes") from third-party sources (e.g., a search engine). Alternatively, the context-based help system may generate a score for each help article based on the precision of a context criterion. For example, a context criterion of (equation, experienced) may be considered more precise than an context criterion of (equation, *) or (* , experienced). Also, the context-based help system may weight the features when generating a score. For example, the content feature may have a higher weight than the user feature resulting in a help article with the context criterion of (equation, *) having a higher score than a help article with the context criterion of (* , experienced). Also, the context-based help system may also use weighing when generating scores for near matches.

In some embodiments, the mapping of context criteria to help articles may be derived from user interactions with a query-based help system, When a user submits a query, the context, the returned help articles, and clicked through information for the help articles can be logged. A machine learning technique may be applied to the logged data to identify a context criteria for each help article. For example, if a first help article on equations is almost always clicked through in the context of (equation, experienced) but in no other context, and a second help article on equations is almost always clicked through in the context of (equation, novice) but in no other context, then the context criterion of (equation, experienced) would be associated with the first help article and the context criterion of (equation, novice) would be associated with the second help article. If, however, the first and second help articles were clicked through equally in each context, both help articles might be associated with the context of (equation, *). The "association" may be represented by a probability of the help article being selected in a certain context.

Figure 4A:
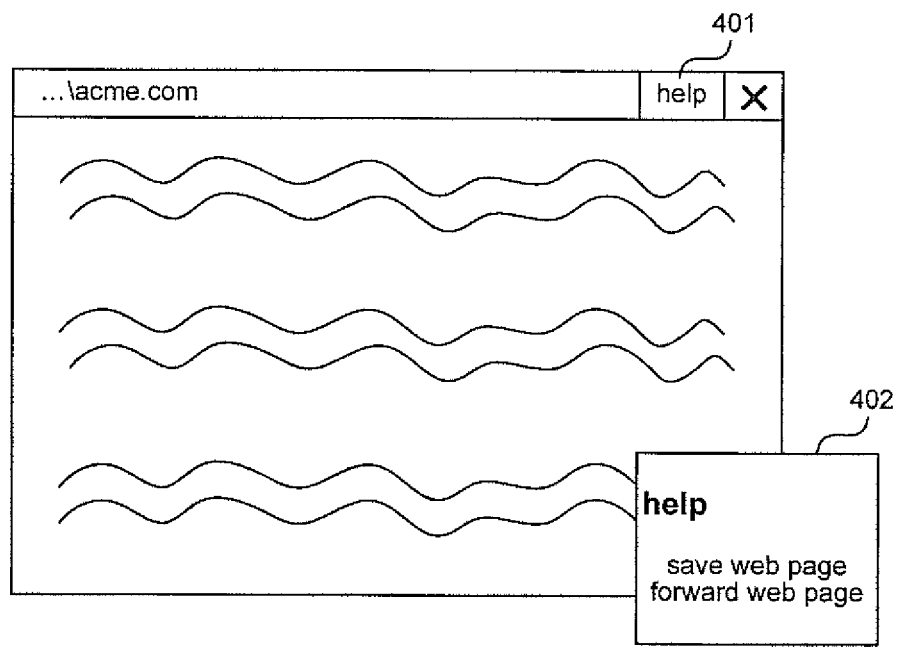
FIGS. 4A-4C illustrate help information that adjusts dynamically based on the content of a web page in some embodiments.
Figure 4B:
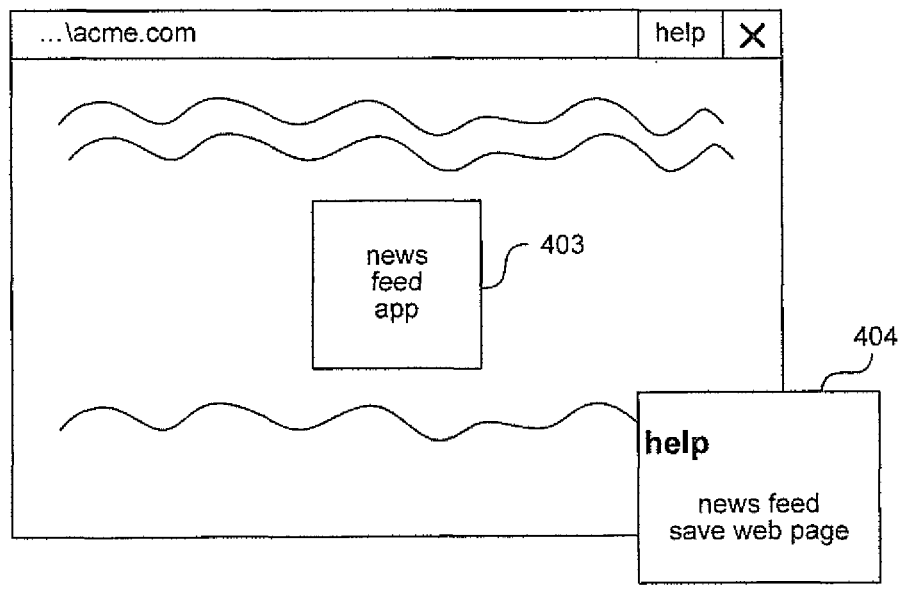
Figure 4C:
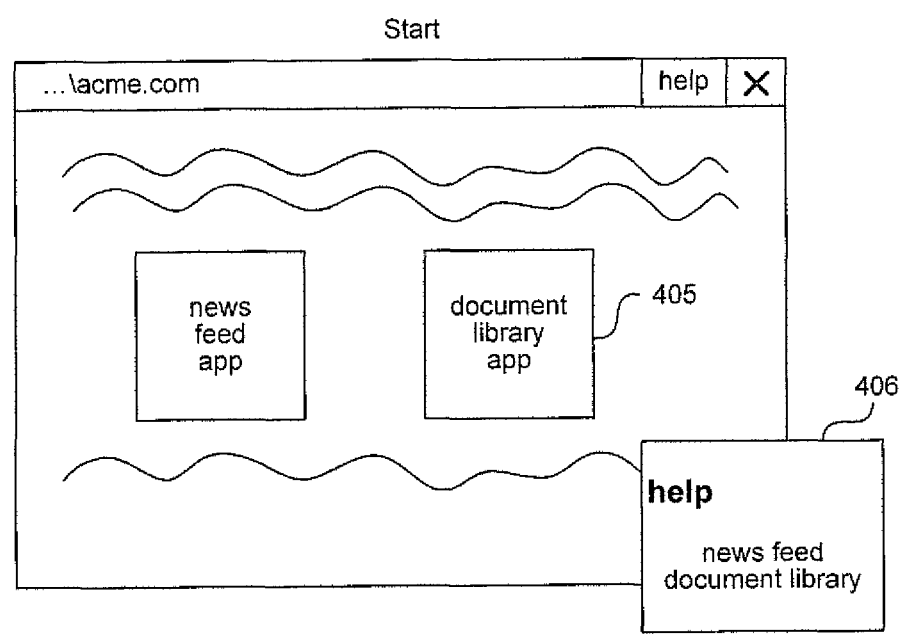

FIGS. 4A-4C illustrate help information that adjusts dynamically based on the content of a web page in some embodiments. In FIG. 4A, the content of the web page includes only textual information. When a user selects the help button 401, the context-based help system presents help information 402, which is appropriate to the content using only just textual information. A page feature may also be included to provide help information that is specific to the type of page (e.g., a page of a discussion forum) or specific to the page as specified by its identifier (e.g., "acme.com"). In this example, the help information includes information relating to saving and forwarding the web page. In FIG. 4B, the content of the web page has been modified to include a link 403 to a newsfeed application. When the user selects the help button, the context-based help system presents help information 404 which is appropriate to the news feed. In this example, the help information relates to the newsfeed application and saving a web page. In FIG. 4C, the content of the web page has been modified to include a link 405 to a document library application. When the user selects the help button, the context-based help system presents help information 406, which is appropriate to the new content. In this example, the help information relates to the newsfeed application and the document library application.

Figure 5A:
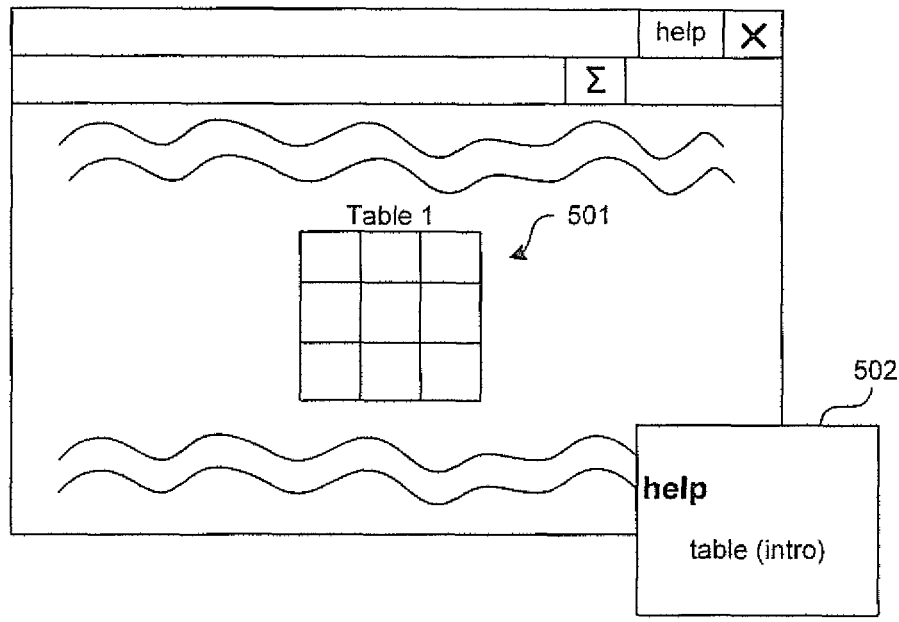
FIGS. 5A and 5B illustrate help information that adjusts dynamically based on the content of a portion of document that is currently being displayed in some embodiments.
Figure 5B:
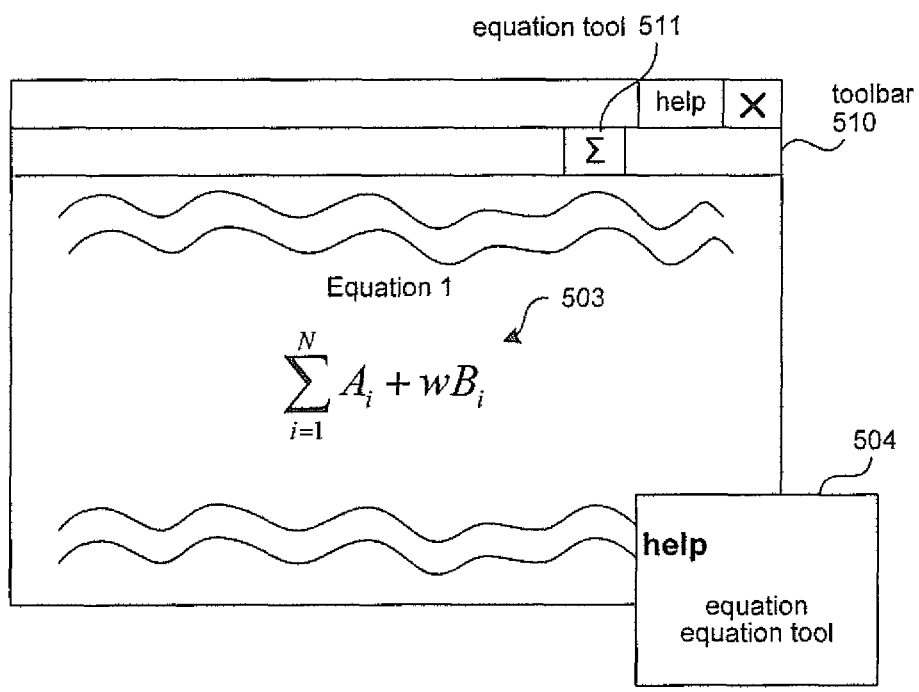

FIGS. 5A and 5B illustrate help information that adjusts dynamically based on the content of a portion of document that is currently being displayed in some embodiments. In FIG. 5A, a portion of a document is being displayed by a word processing program. The portion of the document includes a table 501. When a user selects the help button, the help information 502 relates to a table. In addition, if the user is a novice user of the word processing program, then the table information may include introductory information on a table. If the user was an experienced user, then the help information may describe more advanced features for manipulating a table. Also, if the license for the word processing program was a trial license, the help information may describe certain table capabilities but indicate that they are not available for a trial license. In FIG. 5B, the portion of the document being displayed includes an equation 503. When a user selects the help button, the help information 504 relates to equations. In addition, since the tool bar 510 includes a button or icon 511 for an equation tool, the help information also includes help information that specifically relates to using the equation tool.

Figure 6:
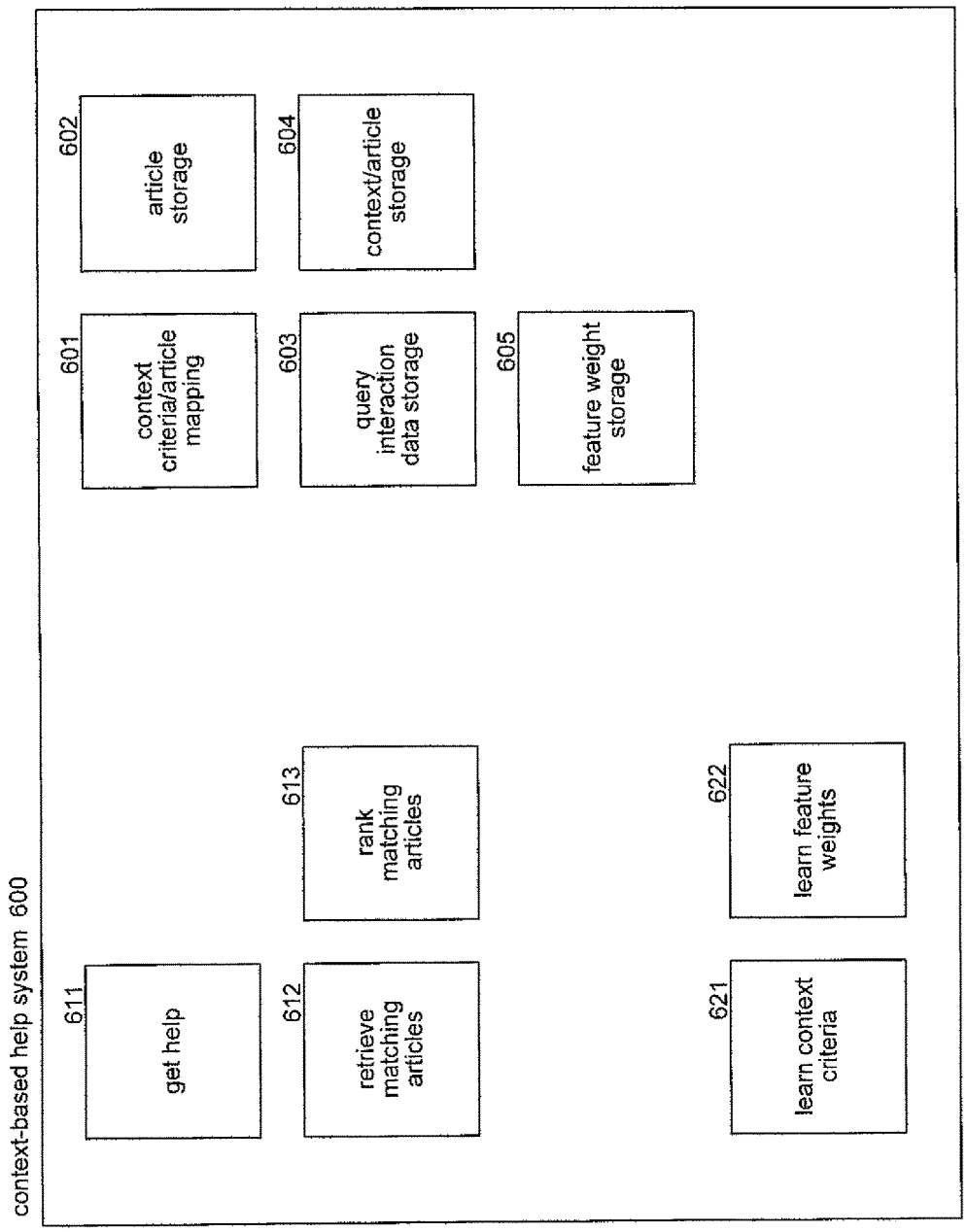
FIG. 6 is a block diagram that illustrates components of a context-based help system in some embodiments.

FIG. 6 is a block diagram that illustrates components of a context-based help system in some embodiments. The context-based help system 600 includes a context criteria/article mapping 601, an article storage 602, a query interaction data storage 603, a context/article statistics storage 604, and a feature weight storage 605. The context criteria/article mapping contains a mapping of context criteria to articles. The article storage contains the help articles. The query interaction data storage contains clickthrough data collected when users submitted queries. The data may identify help articles presented by a query-based context system and the contexts in which the articles were clicked through (e.g., positive examples) and the context in which the articles were not clicked through (e.g., negative examples). The data may be used to generate the mappings from context criteria to help articles. The context/article statistics storage contains clickthrough data for the help articles presented by the context-based help system. The data may be used to rank the matching help articles based on popularity. The feature weight storage contains the weights of features to be used in generating a score to ranking the help articles.

The context-based help system also includes a get help component 611, a retrieve matching articles component 612, and a rank matching articles component 613. The get help component is invoked when a user submits a generic request for help and retrieves and returns the matching help articles. The get help component invokes the retrieve matching articles component to identify and retrieve the matching help articles and then invokes the rank matching articles component to rank the articles. The context-based help system may also include a learn context component 621 and a learn feature weights component 622. The learn context criteria component may use the query interaction data to learn which context criteria should be associated with which help articles. The learn feature weights component may use the query interaction data and the context/article statistics to learn how to weight the various features to be used to rank the help articles.

The computing devices and systems on which the context-based help system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that includes computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the context-based help system. The data transmission media is used for transmitting data via transitory, propagating signals or carrier waves (e.g., electromagnetism) via a wired or wireless connection.

The context-based help system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the context-based help system may be implemented in hardware using, for example, an application-specific integrated circuit ("ASIC").

Figure 7:
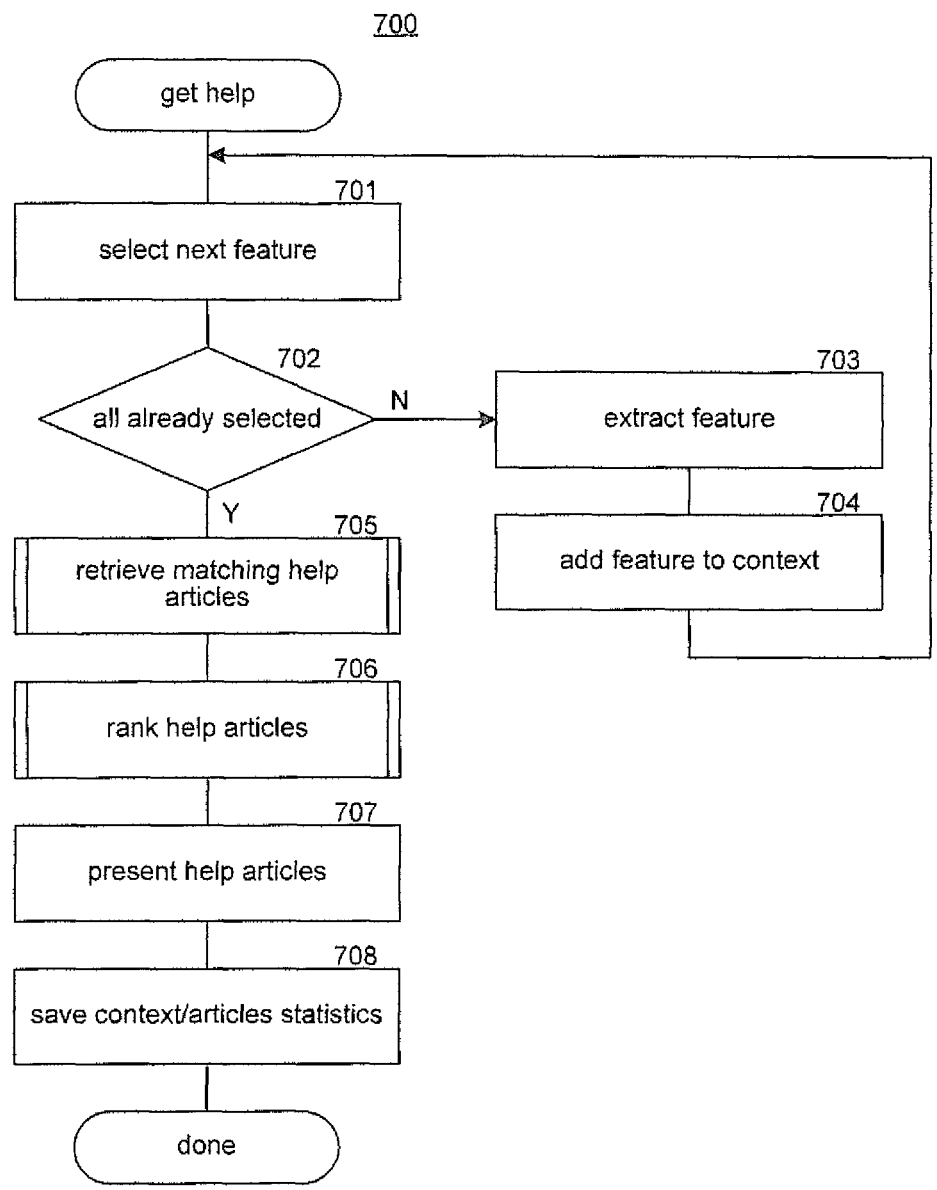
FIG. 7 is a flow diagram that illustrates the processing of a get help component in some embodiments of the context-based help system.

FIG. 7 is a flow diagram that illustrates the processing of a get help component in some embodiments of the context-based help system. The get help component 700 may be invoked when a user submits a generic request or when a computer program automatically decides to present help. The component retrieves and ranks the matching help articles. In blocks 701-704, the component loops extracting the features for the context. These blocks may be tailored to the specific computer program. Alternatively, the computer program may provide the context when it invokes the get help component. In block 701, the component selects the next feature of the context. In decision block 702, if all the features have already been selected, then the component continues at block 705, else the component continues at block 703. In block 703, the component extracts the value for the selected feature. In block 704, the component adds the extracted value to the context and then loops to block 701 to select the next feature of the context. In block 705, the component invokes a component to retrieve the matching help articles. In block 706, the component invokes a component to rank the retrieved help articles. In block 707, the component presents the help articles. In block 708 the component saves any context/article statistics associated with the presented help articles and then completes.

Figure 8:
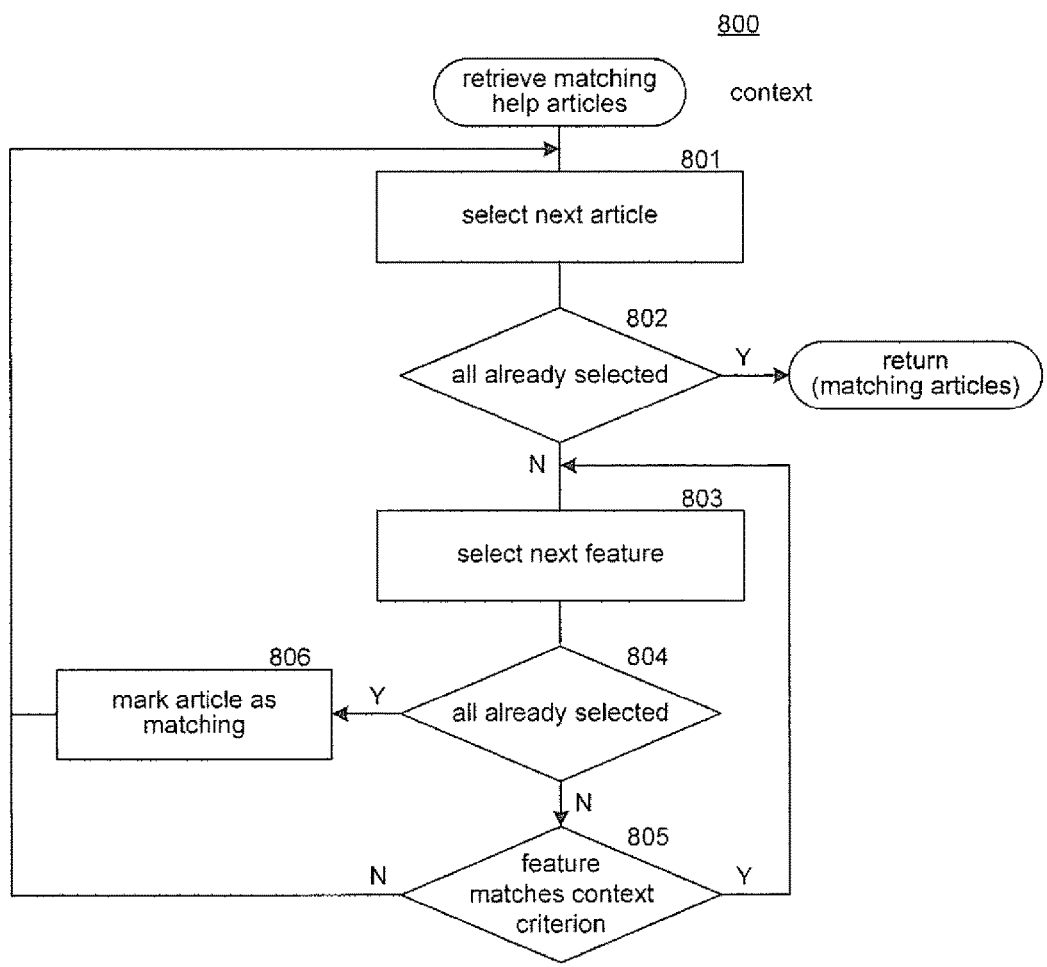
FIG. 8 is a flow diagram that illustrates the processing of a retrieve matching help articles component in some embodiments of the context-based help system.

FIG. 8 is a flow diagram that illustrates the processing of a retrieve matching help articles component in some embodiments of the context-based help system. The retrieve matching help articles component 800 is passed a context and returns help articles that match that context. The flow diagram illustrates a logical flow for retrieving matching help articles where help articles are selected as well as features for each help article. The identifying and retrieving of matching help articles may employ indexes that map values of features to help articles, may employ a database, and so on, to speed up the processing. In block 801, the component selects the next help article. In decision block 802, if all the help articles have already been selected, then the component returns the matching help articles, else the component continues at block 803. In block 803, the component selects the next feature of the context. In decision block 804, if all the features have already been selected for the selected help article, then the selected help article matches the context and the component continues at block 806, else the component continues at block 805. In decision block 805, if the feature matches the corresponding feature of the context criteria, then the component loops to block 803 to select the next feature, else there is no match and the component loops to block 801 to select the next help article.

In block 806, the component marks the selected help article as matching and loops to block 801 to select the next help article.

Figure 9:
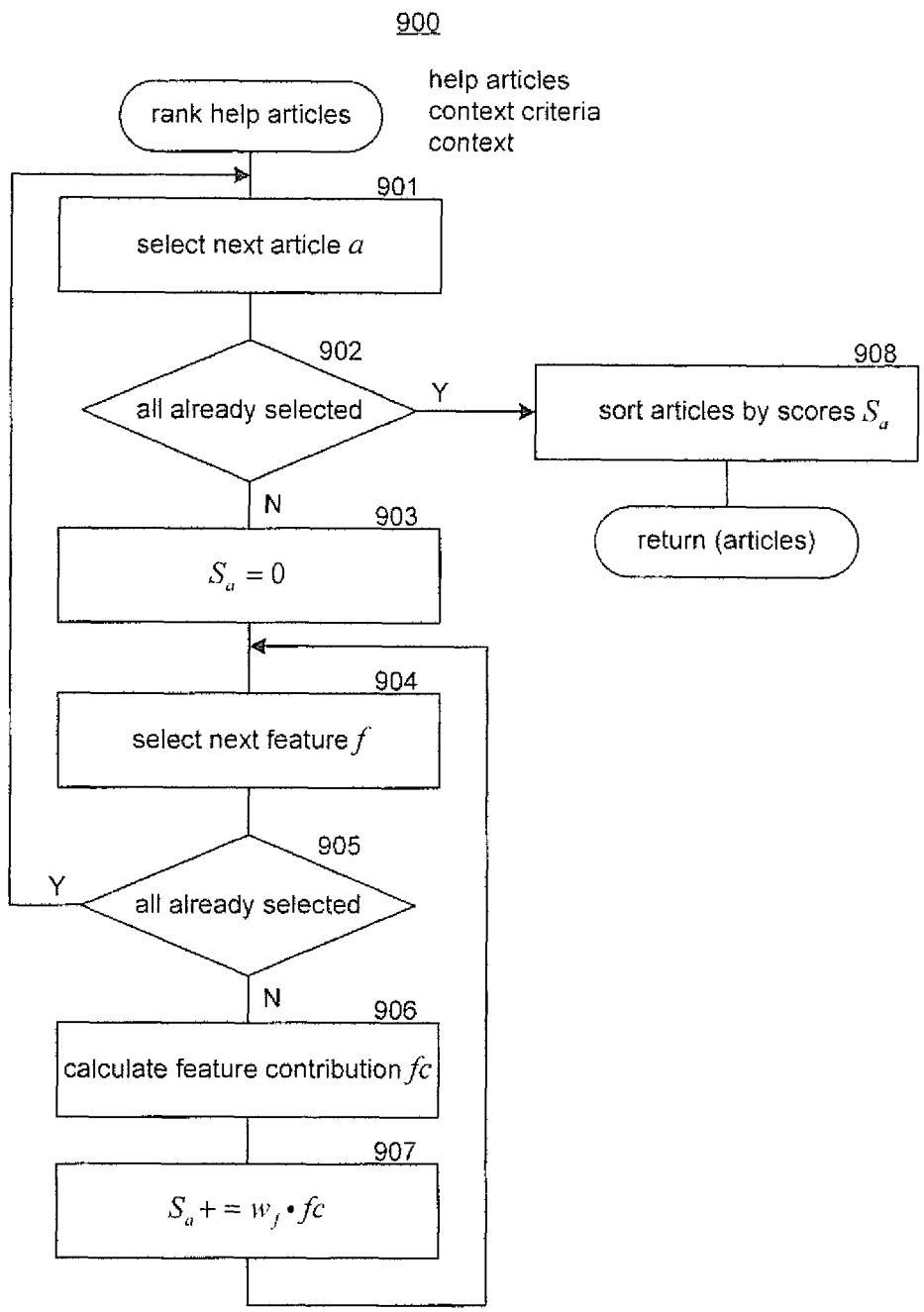
FIG. 9 is a flow diagram that illustrates the processing of a rank help articles component in some embodiments of the context-based help system.

FIG. 9 is a flow diagram that illustrates the processing of a rank help articles component in some embodiments of the context-based help system. The rank help articles component 900 is passed an indication of the help articles, the context criteria for the help articles, and the context. The component generates a score for each help article using a ranking metric and then orders the help articles based on their scores. In block 901, the component selects the next matching help article. In decision block 902, if all the matching help articles have already been selected, then the component continues at block 908, else component continues at block 903. In block 903, the component initializes the score for the selected help article. In blocks 904-907, the component loops accumulating contributions to the score for each feature. In block 904, the component selects the next feature. In decision block 905, if all the features have already been selected, then the component loops to block 901 to select the next help article, else the component continues at block 906. In block 906, the component calculates the feature contribution for the selected feature. For example, if the context criterion for the selected help article has a specific value (e.g., experienced), the contribution might be 1.0. In contrast, if the context criterion specifies a wildcard for the feature, the contribution might be 0.5. In block 906, the component adds the contribution adjusted by a weight for the feature to a running total of the score and then loops to block 904 to select the next feature.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the context-based help system may be used to provide help for a web-based application platform that provides computer programs that support document management, collaboration, social networks, intranet portals, and so on. The context-based help system may also provide help information based on structured content of a document (e.g., equations, tables, frames, and footnotes) or unstructured content (e.g., text). Accordingly, the invention is not limited except as by the appended claims.

The invention claimed is:

1. A computer-readable storage medium storing computer-executable instructions for controlling a computing system to provide help information relating to a user of a computer program, the computer-executable instructions comprising:
   instructions that receive an indication of a generic request for help;
   instructions that identify a context in which help is requested, the context including content of a document that is currently being displayed by the computer program and identification of tools provided by the computer program that are currently available for selection to manipulate the content of the document, the tools being separate from the content of the document;
   instructions that generate a feature vector including multiple features representing the context, wherein the content of the document that is currently being displayed by the computer program is a first feature of the multiple features, the identification of tools provided by the computer program that are currently available for selection to manipulate the content of the document is a second feature, and a third feature of the multiple features is selected from a group consisting of a version of the computer program and an identifier of a license type for the computer program, wherein at least one of the multiple features is based on a type of formatting of structured content of the document currently displayed by the computer program, the type of formatting including a table or an equation;
   instructions that select help information based on the feature vector, wherein the help information includes multiple help articles;
   instructions that rank the multiple help articles based on user interactions with the help articles presented to other users; and
   instructions that present the help information as a response to the generic request for help.

2. The computer-readable storage medium of claim 1 wherein the document has been opened by the computer program.

3. The computer-readable storage medium of claim 1 including instructions that access a context criterion to help article mapping wherein the context criterion specifies one or more contexts that match a help article.

4. The computer-readable storage medium of claim 1 wherein the multiple help articles are ranked based on a weighting of features defining the context.

5. The computer-readable storage medium of claim 1 wherein the computer program is a word processing program and the document is a word processing document.

6. The computer-readable storage medium of claim 1 wherein the content is provided by the user.

7. A computer-readable storage medium storing computer-executable instructions for controlling a computing system to provide help information relating to use of a computer program that displays content of a document and content of a customizable user interface, the customizable user interface includes a help indicator for submitting generic requests for help, the computer-executable instructions comprising:
   instructions that receive an indication of a generic request for help when a user selects the help indicator;
   instructions that identify context in which help is requested, the context including information that is currently being displayed by the computer program as part of the customizable user interface, a first feature selected from a group consisting of a version of the computer program and an identifier of a license type for the computer program, and a second feature based on a type of formatting of structured content of the document currently displayed by the computer program, the type of formatting including a table or an equation;
   instructions that select help information based on the context wherein the selected help information varies based on information that is currently being displayed as part of the customizable user interface and based on the first and second features, wherein the help information includes multiple help articles;
   instructions that rank the multiple help articles based on user interactions with the help articles presented to other users; and
   instructions that present the help information as a response to the generic request
   wherein the customizable user interface is separate from content of a document displayed by the computer program.

8. A computing system to provide help information relating to use of a computer program, the computing system comprising:
   a computer-readable storage medium storing:
      instructions that receive an indication of a generic request for help;
      instructions that identify a context in which help is requested, the context including content of a document currently displayed by the computer program;
      instructions that generate a plurality of features relating to the computer program representing the context, the plurality of features including identification of tools provided by the computer program that are currently available for selection, at least one selected from a group consisting of a version of the computer program and an identifier of a license type for the computer program, and a type of formatting of structured content of the document currently displayed by the computer program, the type of formatting including a table or an equation;
      instructions that select help articles based on the context as specified by the features;
      instructions that rank the help articles based on user interactions with the help articles presented to other users; and
      instructions that present an indication of the help articles as a response to the generic request; and
   a processor that executes the computer-executable instructions stored in the computer-readable medium.

9. The computing system of claim 8 wherein at least one of the plurality of features is based on tools available via a tool bar provided by the computer program.

10. The computing system of claim 8, further comprising instructions that access a context criterion to help article mapping that maps context criteria to help articles.

11. The computing system of claim 10 wherein the mappings of context criteria to help articles is based on user interactions with help articles presented in response to specific help requests and based on a context at a time of the user interactions.

12. The computing system of claim 11 wherein the mappings are learned using a machine learning algorithm.

13. The computing system of claim 8 wherein the help articles are ranked based on a weighting of the features.

14. The computing system of claim 8 wherein the help articles are ranked based on user interactions with the help articles presented in a context that is the same as the identified context.

15. A method performed by a computing system for providing help information relating to use of a computer program to a user, the method comprising:
   displaying by the computer program during execution by the computing system content defined by a document, the computer program providing tools for interacting with the document, the tools being separate from the content of the document;
   receiving from a user a generic request for help information;
   identifying context for the help information, the context including a first feature based on displayed content of the document, a second feature based on the provided tools, a third feature selected from a group consisting of a version of the computer program and an identifier of a license type for the computer program, and a fourth feature based on a type of formatting of structured content of the document, the type of formatting including a table or an equation, the first feature, the second feature, the third feature, and the fourth feature forming a feature vector;

selecting, from a mapping of context criteria to help articles, those help articles that provide help for the provided tools based on the help articles matching the feature vector;

ranking the selected help articles based on a ranking metric derived from user interactions with help articles; and presenting to the user the help articles based on the ranking as a response to the generic request.

16. The method of claim 15 wherein the mapping of context criteria to help articles is learned via a machine learning technique.

17. The method of claim 15 wherein the content is modifiable by the tools.

18. The method of claim 15 wherein the content is provided by the user.

* * * * *